(12) United States Patent
Engelen et al.

(10) Patent No.: US 10,564,253 B2
(45) Date of Patent: Feb. 18, 2020

(54) METHODS AND APPARATUS FOR LIGHT-BASED POSITIONING AND NAVIGATION

(71) Applicant: SIGNIFY HOLDING B.V., Eindhoven (NL)

(72) Inventors: Dirk Valentinus René Engelen, Heusden-Zolder (BE); Bartel Marinus Van De Sluis, Eindhoven (NL); Philip Steven Newton, Waalre (NL); Dzmitry Viktorovich Aliakseyeu, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/221,917

(22) Filed: Dec. 17, 2018

(65) Prior Publication Data

US 2019/0120930 A1 Apr. 25, 2019

Related U.S. Application Data

(62) Division of application No. 15/038,314, filed as application No. PCT/IB2014/065732 on Oct. 31, 2014, now Pat. No. 10,185,025.

(60) Provisional application No. 61/906,469, filed on Nov. 20, 2013.

(51) Int. Cl.
| | |
|---|---|
| *H04B 10/08* | (2006.01) |
| *G01S 5/16* | (2006.01) |
| *G01S 1/70* | (2006.01) |
| *H04B 10/079* | (2013.01) |
| *H04B 10/40* | (2013.01) |

(52) U.S. Cl.
CPC ............. *G01S 5/163* (2013.01); *G01S 1/70* (2013.01); *H04B 10/0795* (2013.01); *H04B 10/40* (2013.01)

(58) Field of Classification Search
CPC ....... G01S 5/163; G01S 1/70; H04B 10/0795; H04B 10/40
USPC .......................................................... 398/25
See application file for complete search history.

(56) References Cited

U.S. PATENT DOCUMENTS

| | | | |
|---|---|---|---|
| 5,838,116 A | 11/1998 | Katyl et al. | |
| 7,667,855 B2 | 2/2010 | Piazza | |

(Continued)

FOREIGN PATENT DOCUMENTS

| | | |
|---|---|---|
| JP | 2010107235 A2 | 5/2010 |
| JP | 2011517768 T2 | 6/2011 |

(Continued)

*Primary Examiner* — Mohammed R Sedighian
(74) *Attorney, Agent, or Firm* — Meenakshy Chakravorty (57) ABSTRACT

Systems, methods, mobile computing devices and computer-readable media are described herein relating to light-based positioning. In various embodiments, light sources (106) may be commissioned to selectively energize one or more LEDs (520) to emit light carrying a coded light signal. The coded light signal may convey information about a location of a lighting effect (102) projected by the one or more LEDs onto a surface (104). In various embodiments, mobile computing devices (100) such as smart phones or tablets may detect these coded light signals from the lighting effects and/or from the light sources, extract the location information, and utilize it to determine their locations within an environment.

6 Claims, 7 Drawing Sheets

(56) References Cited

U.S. PATENT DOCUMENTS

| | | | |
|---|---|---|---|
| 7,996,097 B2* | 8/2011 | DiBernardo | G01S 5/163 |
| | | | 700/56 |
| 8,334,901 B1 | 12/2012 | Ganick et al. | |
| 8,752,761 B2 | 6/2014 | Calvaresse et al. | |
| 9,255,986 B2* | 2/2016 | Deliwala | A63F 13/06 |
| 9,405,000 B2* | 8/2016 | Yeh | G01S 5/16 |
| 2002/0089722 A1 | 7/2002 | Perkins et al. | |
| 2003/0030386 A1 | 2/2003 | Leeb et al. | |
| 2005/0213082 A1 | 9/2005 | DiBernardo et al. | |
| 2009/0080896 A1 | 3/2009 | Pereira et al. | |
| 2009/0284366 A1 | 11/2009 | Haartsen et al. | |
| 2010/0271476 A1 | 10/2010 | Damink et al. | |
| 2011/0153201 A1 | 6/2011 | Park et al. | |
| 2012/0022826 A1 | 1/2012 | Giesekus | |
| 2012/0126721 A1 | 5/2012 | Kuenzler et al. | |
| 2012/0146518 A1 | 6/2012 | Keating et al. | |
| 2013/0026942 A1 | 1/2013 | Ryan et al. | |
| 2013/0245937 A1 | 9/2013 | DiBernardo et al. | |
| 2014/0085642 A1 | 3/2014 | Kim et al. | |
| 2014/0093249 A1 | 4/2014 | Roberts et al. | |

FOREIGN PATENT DOCUMENTS

| | | |
|---|---|---|
| WO | WO2004057927 A1 | 7/2004 |
| WO | WO2006095317 A1 | 9/2006 |
| WO | WO2006111934 A1 | 10/2006 |
| WO | WO2007063480 A2 | 6/2007 |
| WO | WO2012014187 A1 | 2/2012 |
| WO | WO2012018513 A1 | 2/2019 |

* cited by examiner

METHODS AND APPARATUS FOR LIGHT-BASED POSITIONING AND NAVIGATION

TECHNICAL FIELD

The present invention is directed generally to light-based positioning and navigation. More particularly, various inventive methods and apparatus disclosed herein relate to light sources commissioned and configured to emit coded signals carrying information about locations of lighting effects they produce, as well as the use of this information by mobile computing devices to determine a location of a mobile computing device within an environment.

BACKGROUND

Digital lighting technologies, i.e. illumination based on semiconductor light sources, such as light-emitting diodes (LEDs), offer a viable alternative to traditional fluorescent, HID, and incandescent lamps. Functional advantages and benefits of LEDs include high energy conversion and optical efficiency, durability, lower operating costs, and many others. Recent advances in LED technology have provided efficient and robust full-spectrum lighting sources that enable a variety of lighting effects in many applications. Some of the fixtures embodying these sources feature a lighting module, including one or more LEDs capable of producing different colors, e.g. red, green, and blue, as well as a processor for independently controlling the output of the LEDs in order to generate a variety of colors and color-changing lighting effects.

Coded light (CL) systems generally comprise a plurality of lights within each of which is embedded a unique identifier or code. The invisible identifier or code can be embedded in light sources such as LEDs, as well as incandescent, halogen, fluorescent, and high-intensity discharge lamps. The identifier is based on modulation of visible light of the light source or by placing an additional infrared source in or with the light source and modulating that light emitted by this infrared source. LEDs are particularly well-suited for CL systems since they allow for high modulation bandwidth and frequency.

The unique identifier or code emitted by the light source can be utilized by a wide variety of tools and applications, including the identification of one or more specific light sources in the presence of numerous light sources, which in turn enables applications such as lighting manipulation and modification schemes. Further, information about the spatiotemporal location of the identified light source can either be separately associated with the identified light source's identifier, or can be directly embedded into the code transmitted by the coded light source. Coded light systems can be established in any location where a receiver capable of detecting coded light can be used, including but not limited to shopping malls, homes, office buildings, tunnels, subways, parking garages, and other locations.

As urbanization continues, more and larger indoor and/or underground environments will be built for shopping, parking, traffic, living, and so forth. Many such environments may alter, weaken and/or block global positioning system (GPS) signals, making navigation with mobile computing devices such as smart phones difficult. Those same environments may lack natural sunlight, and therefore may be lit with artificial lighting. Technology exists that enables sources of that artificial light to emit locational information that may be used by mobile computing devices for navigational purposes. However, a local network connection (e.g., Wi-Fi) may be required for the mobile computing device to associate a particular light source with a particular location. Further, such systems may not provide sufficient information for a mobile computing device to determine its precise location with sufficient accuracy.

Thus, there is a need in the art for light-based navigation and positioning technology that does not require a mobile computing device to connect to a local (e.g., wireless) network, and that is more accurate than existing approaches.

SUMMARY

The present disclosure is directed to inventive methods and apparatus for light-based positioning. For example, light sources may be configured, e.g., using commissioning computing devices, to emit coded light signals that carry information about a position of lighting effects projected by the light sources. Mobile computing devices such as smart phones and/or tablet computers may utilize this information to determine their locations within an environment.

Generally, in one aspect, the invention relates to a computer-implemented method for calculating a location of a mobile computing device within an environment that includes: receiving, at the mobile computing device, a coded light signal originating from a light source; extracting, by the mobile computing device from the coded light signal, information about a location of a lighting effect projected by the light source onto a surface; determining, by the mobile computing device, an orientation of the mobile computing device relative to the surface; and calculating, by the mobile computing device, the location of the mobile computing device within the environment based at least in part on the location of the lighting effect and the orientation of the mobile computing device.

In various embodiments, the calculating step may include calculating a distance of the mobile computing device from a center of the lighting effect. In various versions, the method may further include calculating, by the mobile computing device, an angle between a first vector extending from a focal point of a camera lens of the mobile computing device to the surface along a central axis of the camera lens, and a second vector extending from the focal point to the center of the lighting effect, wherein calculating the location is further based on the angle. In various versions, calculating the angle may be based at least in part on a distance between a rendition of the lighting effect on a display of the mobile computing device and a center of the display. In various versions, calculating the location may be further based on an estimated reference distance of the mobile device from the surface.

In various embodiments, the calculating step may include calculating a distance of the mobile computing device from the light source. In various versions, the method may further include calculating, by the mobile computing device, an angle between a first vector that is normal to the surface and a second vector that extends from the light source to the mobile computing device. In various versions, calculating the angle may be based at least in part on a distance between a rendition of the light source on a display of the mobile computing device and a center of the display.

In various embodiments, the method may include extracting, by the mobile computing device from the coded light signal, a reference distance of the light source from the surface, wherein calculating the distance of the mobile computing device from the light source is based on the reference distance. In various embodiments, the method may further include determining, by the mobile computing device, an angle between a first vector that extends along the surface from the mobile computing device to a position on the surface opposite the light source, and a second reference vector that is predefined relative to a magnetic pole, wherein calculating the distance of the mobile computing device from the light source is based on the extracted angle.

In another aspect, the invention relates to a light source that includes one or more light-emitting diodes (LEDs); and a controller operably coupled with the one or more LEDs. The controller may be configured to selectively energize the one or more LEDs to emit light carrying a coded light signal, wherein the coded light signal conveys information about a location of a lighting effect projected by the one or more LEDs onto a surface. In various versions, the information about the location of the lighting effect includes a location of a center of the lighting effect.

In various embodiments, the coded light signal may further convey a reference distance between the light source and the surface. In various embodiments, the controller may be further configured to derive the information about the location of the lighting effect based on a direction of a light beam produced by the one or more LEDs.

In various embodiments, the controller may be further configured to derive the information about the location of the lighting effect based on a width of a light beam produced by the one or more LEDs. In various embodiments, a global positioning system (GPS) unit may be operably coupled with the controller, and the controller may be further configured to derive the information about the location of the lighting effect based on data received from the GPS unit and a direction of the emitted light beam.

In another aspect, the invention relates to a computer-implemented method for commissioning a light source, including: placing a commissioning device in a lighting effect projected by the light source onto a surface; determining, by the commissioning device, a location of the commissioning device within an environment; and transmitting, by the commissioning device to the light source, a location of the lighting effect within the environment, wherein the location of the light effect is based at least in part on the determined location of the commissioning device.

In various embodiments, the transmitting may include transmitting a reference distance between the light source and the surface. In various embodiments, the transmitting may include transmitting an angle between a first vector that is normal to the surface and extends from a center of the lighting effect, and a second vector from the commissioning device to the light source. In various versions, the method may further include calculating, by the commissioning device, the angle based at least in part on a distance between a rendition of the lighting effect on a display of the commissioning device and a center of the display.

In various embodiments, the transmitting may include transmitting an angle between a first vector that extends along the surface from a center of the lighting effect to a position on the surface opposite the light source, and a second reference vector that is predefined relative to a magnetic pole. In various embodiments, the method may include calculating, by the mobile computing device, the angle based at least in part on an orientation of the mobile computing device relative to the magnetic pole.

As used herein for purposes of the present disclosure, the term "LED" should be understood to include any electroluminescent diode or other type of carrier injection/junction-based system that is capable of generating radiation in response to an electric signal. Thus, the term LED includes, but is not limited to, various semiconductor-based structures that emit light in response to current, light emitting polymers, organic light emitting diodes (OLEDs), electroluminescent strips, and the like. In particular, the term LED refers to light emitting diodes of all types (including semi-conductor and organic light emitting diodes) that may be configured to generate radiation in one or more of the infrared spectrum, ultraviolet spectrum, and various portions of the visible spectrum (generally including radiation wavelengths from approximately 400 nanometers to approximately 700 nanometers). Some examples of LEDs include, but are not limited to, various types of infrared LEDs, ultraviolet LEDs, red LEDs, blue LEDs, green LEDs, yellow LEDs, amber LEDs, orange LEDs, and white LEDs (discussed further below). It also should be appreciated that LEDs may be configured and/or controlled to generate radiation having various bandwidths (e.g., full widths at half maximum, or FWHM) for a given spectrum (e.g., narrow bandwidth, broad bandwidth), and a variety of dominant wavelengths within a given general color categorization.

For example, one implementation of an LED configured to generate essentially white light (e.g., a white LED) may include a number of dies which respectively emit different spectra of electroluminescence that, in combination, mix to form essentially white light. In another implementation, a white light LED may be associated with a phosphor material that converts electroluminescence having a first spectrum to a different second spectrum. In one example of this implementation, electroluminescence having a relatively short wavelength and narrow bandwidth spectrum "pumps" the phosphor material, which in turn radiates longer wavelength radiation having a somewhat broader spectrum.

It should also be understood that the term LED does not limit the physical and/or electrical package type of an LED. For example, as discussed above, an LED may refer to a single light emitting device having multiple dies that are configured to respectively emit different spectra of radiation (e.g., that may or may not be individually controllable). Also, an LED may be associated with a phosphor that is considered as an integral part of the LED (e.g., some types of white LEDs). In general, the term LED may refer to packaged LEDs, non-packaged LEDs, surface mount LEDs, chip-on-board LEDs, T-package mount LEDs, radial package LEDs, power package LEDs, LEDs including some type of encasement and/or optical element (e.g., a diffusing lens), etc.

The term "light source" should be understood to refer to any one or more of a variety of radiation sources, including, but not limited to, LED-based sources (including one or more LEDs as defined above).

A given light source may be configured to generate electromagnetic radiation within the visible spectrum, outside the visible spectrum, or a combination of both. Hence, the terms "light" and "radiation" are used interchangeably herein. Additionally, a light source may include as an integral component one or more filters (e.g., color filters), lenses, or other optical components. Also, it should be understood that light sources may be configured for a variety of applications, including, but not limited to, indication, display, and/or illumination. An "illumination source" is a light source that is particularly configured to generate radiation having a sufficient intensity to effectively illuminate an interior or exterior space. In this context, "sufficient intensity" refers to sufficient radiant power in the visible spectrum generated in the space or environment (the unit "lumens" often is employed to represent the total light output from a light source in all directions, in terms of radiant power or "luminous flux") to provide ambient illumination (i.e., light that may be perceived indirectly and that may be, for example, reflected off of one or more of a variety of intervening surfaces before being perceived in whole or in part).

The term "spectrum" should be understood to refer to any one or more frequencies (or wavelengths) of radiation produced by one or more light sources. Accordingly, the term "spectrum" refers to frequencies (or wavelengths) not only in the visible range, but also frequencies (or wavelengths) in the infrared, ultraviolet, and other areas of the overall electromagnetic spectrum. Also, a given spectrum may have a relatively narrow bandwidth (e.g., a FWHM having essentially few frequency or wavelength components) or a relatively wide bandwidth (several frequency or wavelength components having various relative strengths). It should also be appreciated that a given spectrum may be the result of a mixing of two or more other spectra (e.g., mixing radiation respectively emitted from multiple light sources).

The term "lighting fixture" is used herein to refer to an implementation or arrangement of one or more lighting units in a particular form factor, assembly, or package. The term "lighting unit" is used herein to refer to an apparatus including one or more light sources of same or different types. A given lighting unit may have any one of a variety of mounting arrangements for the light source(s), enclosure/housing arrangements and shapes, and/or electrical and mechanical connection configurations. Additionally, a given lighting unit optionally may be associated with (e.g., include, be coupled to and/or packaged together with) various other components (e.g., control circuitry) relating to the operation of the light source(s). An "LED-based lighting unit" refers to a lighting unit that includes one or more LED-based light sources as discussed above, alone or in combination with other non LED-based light sources. A "multi-channel" lighting unit refers to an LED-based or non LED-based lighting unit that includes at least two light sources configured to respectively generate different spectrums of radiation, wherein each different source spectrum may be referred to as a "channel" of the multi-channel lighting unit.

The term "controller" is used herein generally to describe various apparatus relating to the operation of one or more light sources. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media (generically referred to herein as "memory," e.g., volatile and non-volatile computer memory such as RAM, PROM, EPROM, and EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers.

The term "addressable" is used herein to refer to a device (e.g., a light source in general, a lighting unit or fixture, a controller or processor associated with one or more light sources or lighting units, other non-lighting related devices, etc.) that is configured to receive information (e.g., data) intended for multiple devices, including itself, and to selectively respond to particular information intended for it. The term "addressable" often is used in connection with a networked environment (or a "network," discussed further below), in which multiple devices are coupled together via some communications medium or media.

In one network implementation, one or more devices coupled to a network may serve as a controller for one or more other devices coupled to the network (e.g., in a master/slave relationship). In another implementation, a networked environment may include one or more dedicated controllers that are configured to control one or more of the devices coupled to the network. Generally, multiple devices coupled to the network each may have access to data that is present on the communications medium or media; however, a given device may be "addressable" in that it is configured to selectively exchange data with (i.e., receive data from and/or transmit data to) the network, based, for example, on one or more particular identifiers (e.g., "addresses") assigned to it.

The term "network" as used herein refers to any interconnection of two or more devices (including controllers or processors) that facilitates the transport of information (e.g. for device control, data storage, data exchange, etc.) between any two or more devices and/or among multiple devices coupled to the network. As should be readily appreciated, various implementations of networks suitable for interconnecting multiple devices may include any of a variety of network topologies and employ any of a variety of communication protocols. Additionally, in various networks according to the present disclosure, any one connection between two devices may represent a dedicated connection between the two systems, or alternatively a non-dedicated connection. In addition to carrying information intended for the two devices, such a non-dedicated connection may carry information not necessarily intended for either of the two devices (e.g., an open network connection). Furthermore, it should be readily appreciated that various networks of devices as discussed herein may employ one or more wireless, wire/cable, and/or fiber optic links to facilitate information transport throughout the network.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

More and larger indoor and/or underground environments are being built for shopping, parking, traffic, living, and so forth. Many such environments may interfere with or even block GPS signals, making conventional GPS-based navigation with mobile computing devices difficult. Those same environments may lack natural sunlight, and therefore may be lit with artificial lighting. Technology exists that enables sources of that artificial light to emit locational information that may be used by mobile computing devices for positioning and/or navigational purposes. However, a local network connection (e.g., Wi-Fi) may be required for the mobile computing device to associate a particular light source with a particular location, and such systems may not provide sufficient information for a mobile computing device to determine its location with sufficient accuracy.

Accordingly, Applicants have recognized and appreciated that it would be beneficial to utilize lighting infrastructure to facilitate location determination and navigation by mobile computing devices within an enclosed environment, without requiring a network connection by the mobile computing devices. Applicants further recognized and appreciated that it would be beneficial to provide light-based navigation and positioning to facilitate calculation of a mobile computing device's location within an environment with a higher degree of accuracy than has been possible in the past.

In view of the foregoing, various embodiments and implementations of the present invention are directed to light-based navigation and positioning. In various embodiments, light sources may be selectively energized to project lighting effects on surfaces. Those lighting effects may carry coded light signals that convey various types of information about a location of the lighting effect. Mobile computing devices such as smart phones and tablet computers may be equipped with cameras configured to utilize rolling shutter techniques to capture these coded light signals. The mobile computing devices may then extract and use the location information for navigation and positioning.

In some embodiments, the coded light signals may simply convey geographic coordinates. For instance, in some embodiments, the coded light signals carried in the lighting effects may convey location data formatted using a version of the World Geodetic System. In such embodiments, a location on Earth may be expressed using latitude, longitude and height. In other embodiments, the coded light signals may convey more literal data, such as "northwest corner of first floor," "women's shoes," "southeast corner of garage floor A2," "floor 5," and so forth. In yet other embodiments, the coded light signals carried in the lighting effects may convey location data that is pertinent in a particular environment such as an underground parking lot or shopping mall. For example, the location data may include Cartesian coordinates defined relative to a predefined origin within the environment. While many of the following examples describe transmission of Cartesian coordinates in coded light signals, this is not meant to be limiting, and other coordinate systems, such as Polar coordinates, may be used instead.

Figure 1:
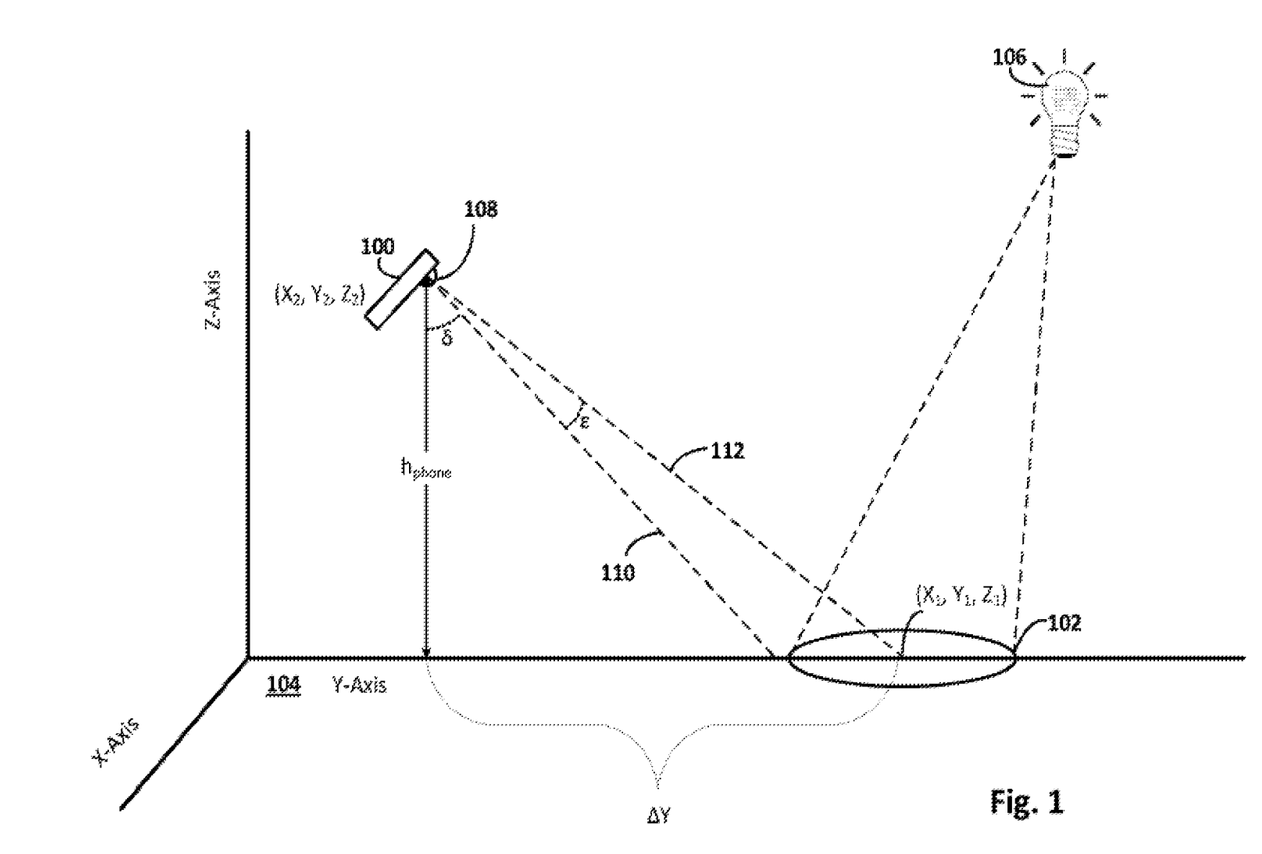
FIG. 1 schematically illustrates one example of how a mobile computing device may determine its location within an environment by determining its distance from a lighting effect, in accordance with various embodiments.

Referring to FIG. 1, in one embodiment, a mobile computing device in the form of a smart phone 100 may be configured to calculate its location in an environment (e.g., garage, store, mall, airport, etc.) by determining a distance to the center of a lighting effect 102 projected onto a surface 104 by a light source 106. In various embodiments, smart phone 100 may be equipped with a camera having a lens 108, and may be configured to utilize rolling shutter to detect a coded light signal carried in the lighting effect.

Assume lighting effect 102 is located at point $(X_1, Y_1, Z_1)$, and that smart phone 100 is located at point $(X_2, Y_2, Z_2)$. In various embodiments, light source 106 may be configured to emit light that carries a coded light signal. In various embodiments, the coded light signal may carry information about a location of lighting effect 102 projected onto surface 104. For example, the coded light signal may carry the location of the center of the lighting effect, $(X_1, Y_1, Z_1)$.

In various embodiments, smart phone 100 may have stored in memory a reference height of smart phone, $h_{phone}$, which may be an estimate of a distance between smart phone 100 and surface 104 when smart phone 100 is carried in a typical manner. For example, if a user of smart phone 100 indicates that her age is 10, then smart phone 100 may assume an average height of a smart phone when carried by a typical ten-year-old girl. In other embodiments, $h_{phone}$ may be conveyed by the coded light signal emitted by light source 106.

In various embodiments, smart phone 100 may determine its orientation relative to surface 104. For instance, in various embodiments, smart phone 100 may determine the angle δ between a vector represented by the line $h_{phone}$ in FIG. 1 and a first vector 110 extending from a focal point of a camera lens 108 of smart phone 100 to surface 104 along a central axis of the camera lens. To determine δ, smart phone 100 may utilize one or more of an accelerometer and/or a gyroscope.

Figure 2:
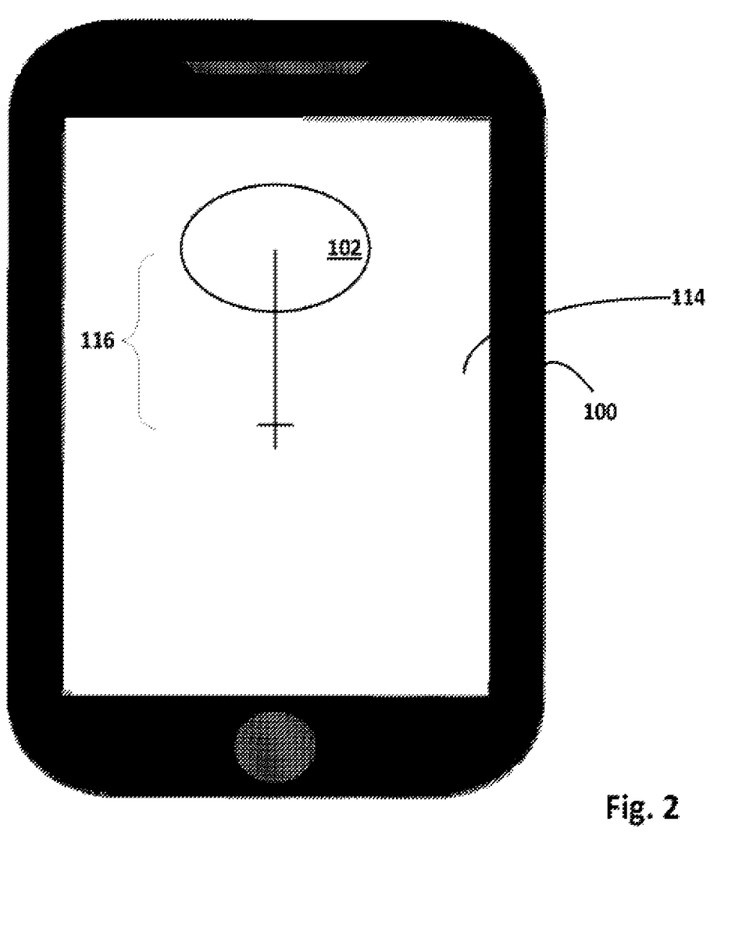
FIG. 2 schematically depicts an example of how a mobile computing device may determine a incident angle using its camera and display, in accordance with various embodiments.

In various embodiments, smart phone 100 may determine an angle ε between first vector 110 and a second vector 112 extending from the focal point to the center of lighting effect 102. If camera lens 108 is pointed directly at the center of lighting effect 102, ε may be zero. In various embodiments, the angle ε may be calculated based on a distance between a rendition of lighting effect 102 on a display of smart phone 100 and a center of the display. An example of this is shown in FIG. 2, where a rendition of lighting effect 102 is rendered on a display 114 of smart phone 100. A distance 116 between a center of the rendition of lighting effect 102 and a center of display 114 may be proportionate to, or otherwise related to, the angle ε of FIG. 1.

Once the angles δ, ε and the reference height $h_{phone}$ are known, smart phone 100 may be configured to calculate various distances between smart phone 100 and a center of lighting effect 102. For instance, smart phone may calculate ΔY using the following equation:

$$\Delta Y = h_{phone} \times \tan(\delta + \varepsilon). \tag{1}$$

FIGS. 1 and 2 demonstrate a simple example of a mobile computing device (i.e. smart phone 100) determining its location in an environment primarily in two dimensions, using a lighting effect. However, disclosed techniques are equally applicable in three dimensions. Further, if a mobile computing device detects more than one lighting effect 102 (or more than one light source 106 as described below), in various embodiments, the mobile computing device may calculate its location within the environment using information conveyed in a coded light signal carried by the brightest observed lighting effect 102 (or light source 106).

Figure 3:
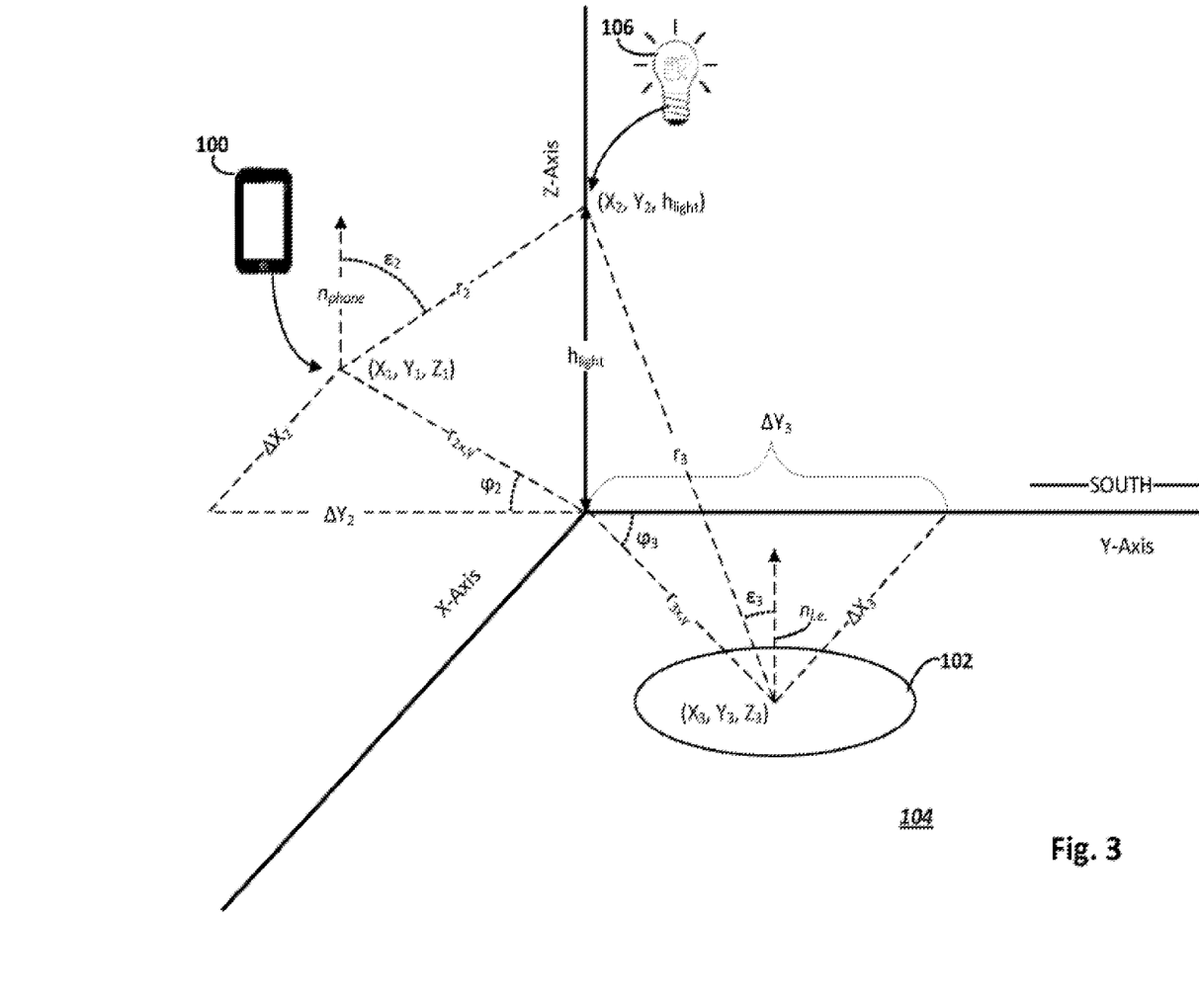
FIG. 3 schematically depicts one example of how a mobile computing device may determine its location within an environment by determining its distance from a light source, and then determining the light source's distance from the light effect it produces, in accordance with various embodiments.

FIG. 3 depicts a three-dimensional example of how a mobile computing device such as smart phone 100 may determine its location within an environment. In this example, smart phone 100 may determine its location on the X/Y plane, $(X_1, Y_1)$, based on its distance from light source 106 and a distance between light source 106 and the lighting effect 102 it projects. Assume that light source 106 projects a lighting effect 102 on a surface 104 that is the X/Y plane. In some embodiments, $Z_1$ may be based on $h_{phone}$ in FIG. 1 because it may represent an estimated height of smart phone 100 when held by a user. Assume also that light source 106 is located at point $(X_2, Y_2, h_{light})$, and that lighting effect 102 is projected onto surface 104 at point $(X_3, Y_3, Z_3)$.

Light source 106 may be commissioned in a process described below to emit a coded light signal. The coded light signal may convey various information about a location of lighting effect 102 in the environment. For example, the coded light signal may convey a reference distance $h_{light}$ between light source 106 and surface 104. Smart phone 100 may extract this information from the coded light signal and use it to perform various calculations to determine its location within the environment.

In various embodiments, smart phone 100 may calculate an angle $\varepsilon_2$ between a first vector, e.g., $n_{phone}$ in FIG. 3, that is normal to surface 104, and a second vector, $r_2$, that extends from light source 106 to smart phone 100. In various embodiments, and similarly as described above with reference to FIG. 2, this calculation may be based on an orientation of smart phone 100 as detected by a gravity sensor, as well as a distance 116 between a rendition of the light source 106 on display 114 of smart phone 100 and a center of display 114.

In various embodiments, a distance between smart phone 100 and light source 106 along the X/Y plane, $r_{2x,y}$, may be calculated based on $h_{light}$ and $\varepsilon_2$, using an equation such as one of the following:

$$r_{2x,y} = h_{light}/\tan(90° - \varepsilon_2) \tag{2}$$

$$r_{2x,y} = h_{light} \times \tan(\varepsilon_2) \tag{3}$$

These equations and others described above and below are not meant to be limiting, and it should be understood that other equations may be performed in other orders without departing from the present disclosure.

In various embodiments, smart phone 100 may calculate an angle $\varphi_2$ between $r_{2x,y}$ and a reference vector. In various embodiments, the reference vector may be transmitted in the coded light signal emitted by light source 106 or preprogrammed into smart phone 100. In some embodiments, the reference vector may be predefined relative to a magnetic pole (including parallel to the pole). For instance, in FIG. 3, the Y-axis is the reference vector, and is aligned with magnetic north/south. Smart phone 100 may be equipped with a sensor such as a compass to detect the magnetic pole, the reference vector, its own orientation relative to the reference vector, and ultimately, angle $\varphi_2$. Once angle $\varphi_2$ is known, $\Delta X_2$ and $\Delta Y_2$ may be calculated using equations such as the following:

$$\Delta X_2 = r_{2x,y} \times \sin(\varphi_2) \tag{4}$$

$$\Delta Y_2 = r_{2x,y} \times \cos(\varphi_2) \tag{5}$$

In some embodiments, once $\Delta X_2$ and $\Delta Y_2$ are known, smart phone 100 may determine its location within the environment further based on a location of lighting effect 102. For instance, the coded light signal emitted by light source 106 may convey, in addition to $h_{light}$, the coordinates $(X_3, Y_3, Z_3)$ of lighting effect 102 as well as an angle $\varepsilon_3$ between a vector $n_{l.e.}$ that is normal to surface 104 and that extends from a center of lighting effect 102, and a vector $r_3$ from light source 106 to the center of lighting effect 102. Once $\varepsilon_3$ is known, a distance $r_{3x,y}$ of light source 106 from lighting effect 102 along surface 104 may be calculated based on $h_{light}$ and $\varepsilon_3$, using an equation such as one of the following:

$$r_{3x,y} = h_{light}/\tan(90° - \varepsilon_3) \tag{6}$$

$$r_{3x,y} = h_{light} \times \tan(\varepsilon_3) \tag{7}$$

In various embodiments, the coded light signal emitted by light source 106 may convey an angle $\varphi_3$ between $r_{3x,y}$ and the Y-axis (which as mentioned above is aligned with magnetic north). Once $r_{3x,y}$ and $\varphi_3$ are known, $\Delta X_3$ and $\Delta Y_3$ may be calculated, e.g., by smart phone 100, using equations such as the following:

$$\Delta X_3 = r_{3x,y} \times \sin(\varphi_3) \tag{8}$$

$$\Delta Y_3 = r_{3x,y} \times \cos(\varphi_3) \tag{9}$$

Once $\Delta X_2$, $\Delta X_3$, $\Delta Y_2$ and $\Delta Y_3$ are known, smart phone 100 may calculate its location $(X_1, Y_1)$ on the X/Y plane relative to the location of the center of lighting effect, $(X_3, Y_3)$, using an equation such as the following:

$$(X_1, Y_1) = (X_3 + \Delta X_2 + \Delta X_3, Y_3 + \Delta Y_2 + \Delta Y_3) \tag{10}$$

$Z_3$ may simply be $h_{phone}$, unless lighting effect 102 is projected onto a different surface than the user holding smart phone 100. In such case, $Z_3$ may be a difference in height between the two surfaces.

In some embodiments, light source 106 may be commissioned to emit a coded light signal that carries its own location, in addition to or instead of the location of the center of lighting effect 102. In such embodiments, it may be possible for smart phone 100 to calculate its position using equations such as (2)-(5), without performing equations (6)-(9).

It should be noted that, in the simplest case where smart phone 100 is placed directly in the light beam emitted by light source 106, e.g., on top of or near the center of lighting effect 102, smart phone 100 may calculate its position as simply the position of lighting effect, $(X_3, Y_3, Z_3)$.

In some scenarios, the mobile computing device may move through an environment quickly. For example, a mobile computing device associated with a vehicle (e.g., a GPS navigation unit) may move through a tunnel, where GPS is unavailable, at a high rate of speed. Light sources in the tunnel may emit coded light signals conveying location information. Because the vehicle is moving quickly, a light sensor matrix may be installed on the vehicle. To compensate for short exposure time, in various embodiments, multiple light sources in the tunnel may emit coded light signals conveying the same location information, e.g., in a synchronized manner to create a longer beam.

As mentioned previously, in order for light source 106 to emit a coded light signal conveying information such as $h_{light}$, the location of the center of lighting effect $(X_3, Y_3, Z_3)$, $\varphi_3$ or $\varepsilon_3$, it may first be commissioned with this data. In some embodiments, each light source 106 may be commissioned manually, e.g., by the manufacturer or by someone installing light source 106 in an environment. In some embodiments, light source 106 may be commissioned using a commissioning device. A commissioning device may in some embodiments be a portable computing device designed specifically for commissioning light sources. For instance, an autonomous robotic commissioning device may be configured to autonomously travel around an environment to multiple lighting effects 102, where it commissions the corresponding light sources 106. In other embodiments, the commissioning device may be a general purpose mobile computing device, such as a smart phone or tablet, that may be placed into a lighting effect 102.

Figure 4:
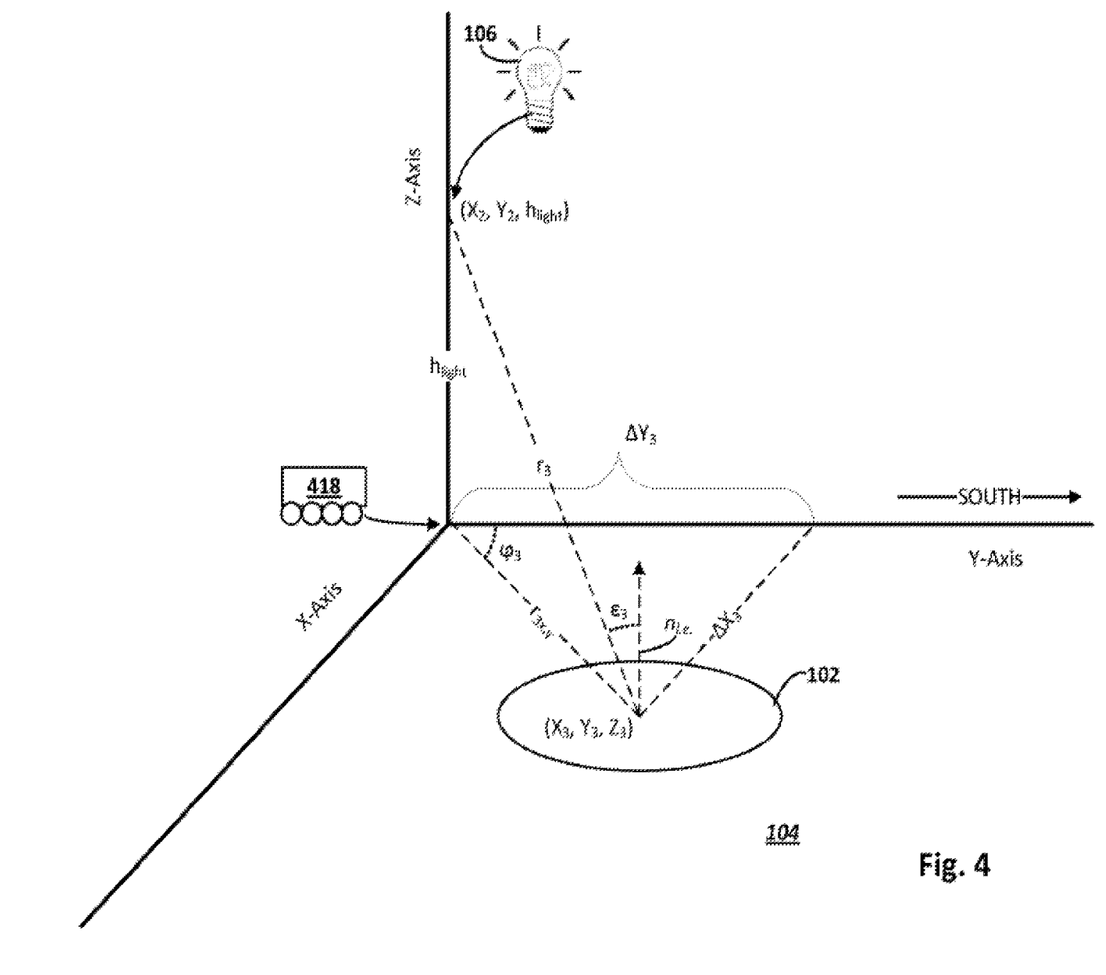
FIG. 4 schematically depicts one example of how a commissioning computing device may be utilized to commission a light source with information about a location of a lighting effect projected by the light source onto a surface, in accordance with various embodiments.

FIG. 4 depicts one example of how an example commissioning device 418 may be used to commission light source 106 so that other mobile computing devices (e.g., smart phone 100) are able to calculate their locations within an environment. As was the case with FIG. 3, assume that a center of lighting effect 102 is located at point $(X_3, Y_3, Z_3)$, and the light source 106 is located at point $(X_2, Y_2, h_{light})$. In some embodiments, light source 106 may emit a coded light signal identifying itself. In other embodiments, an identifier of light source 106 may be input into commissioning device 418 manually.

Commissioning device 418 may be positioned, or may position itself if autonomous, at the center of light effect 102, i.e. at point $(X_3, Y_3, Z_3)$. Assume that commissioning device 418 knows its location, e.g., using GPS or by tracking wheel rotations and turns from a known starting point. Once commissioning device 418 is so positioned, it may commission light source 106 by transmitting information about the location of lighting effect 102 to light source 106, e.g., using various communication technologies such as Wi-Fi, Bluetooth, NFC, RFID, coded light, and so forth.

For instance, commissioning device 418 may transmit its location (which is at the center of lighting effect 102) to light source 106. Commissioning device 418 may also transmit to light source 106 a reference height $h_{light}$ of light source 106. In some embodiments, commissioning device 418 may calculate and transmit to light source 106 various angles, such as angles $\varphi_3$ or $\varepsilon_3$.

In various embodiments, commissioning device 418 may calculate the angle $\varepsilon_3$ between $r_3$ and the normal vector $n_{l.e.}$. In various embodiments, the angle $\varepsilon_3$ may be calculated using techniques similar to those used to calculate the angle $\varepsilon$ in FIGS. 1 and 2. For instance, commissioning device 418 may know an orientation of its camera (or other light sensor), similar to the first vector 110 of FIG. 1. Commissioning device 418 may then calculate $\varepsilon_3$ based on a difference between a center of a display (or a memory buffer containing two-dimensional data representing a captured image) and a rendition of light source 106 on the display (or the memory buffer).

In some embodiments, commissioning device 418 may additionally or alternatively calculate the angle $\varphi_3$ between $r_{3x,y}$ and a reference vector that is predefined relative to a magnetic pole. For instance, in FIG. 4, the reference vector is the Y-axis, which is predefined along the magnetic pole. Commissioning device 418 may be equipped with a sensor such as a compass to detect the magnetic pole, its own orientation relative to the magnetic pole, and ultimately, angle $\varphi_3$. The commissioning device may then transmit this angle $\varphi_3$ to light source 106.

In some embodiments, commissioning device 418 may transmit to light source 106 the location of light source 106, although this is not required when using the techniques demonstrated in FIG. 3. For instance, based on the reference height $h_{light}$ and the angle $\varepsilon_3$, commissioning device 418 may calculate $r_{3x}$,y. Once $r_{3x,y}$ is known, it can be used with the angle $\varphi_3$ to calculate $\Delta X_3$ and $\Delta Y_3$. These values may be added to the position of commissioning device 418 on the X/Y plane, $(X_3, Y_3)$, to determine the position of light source 106 on the X/Y plane.

Figure 5:
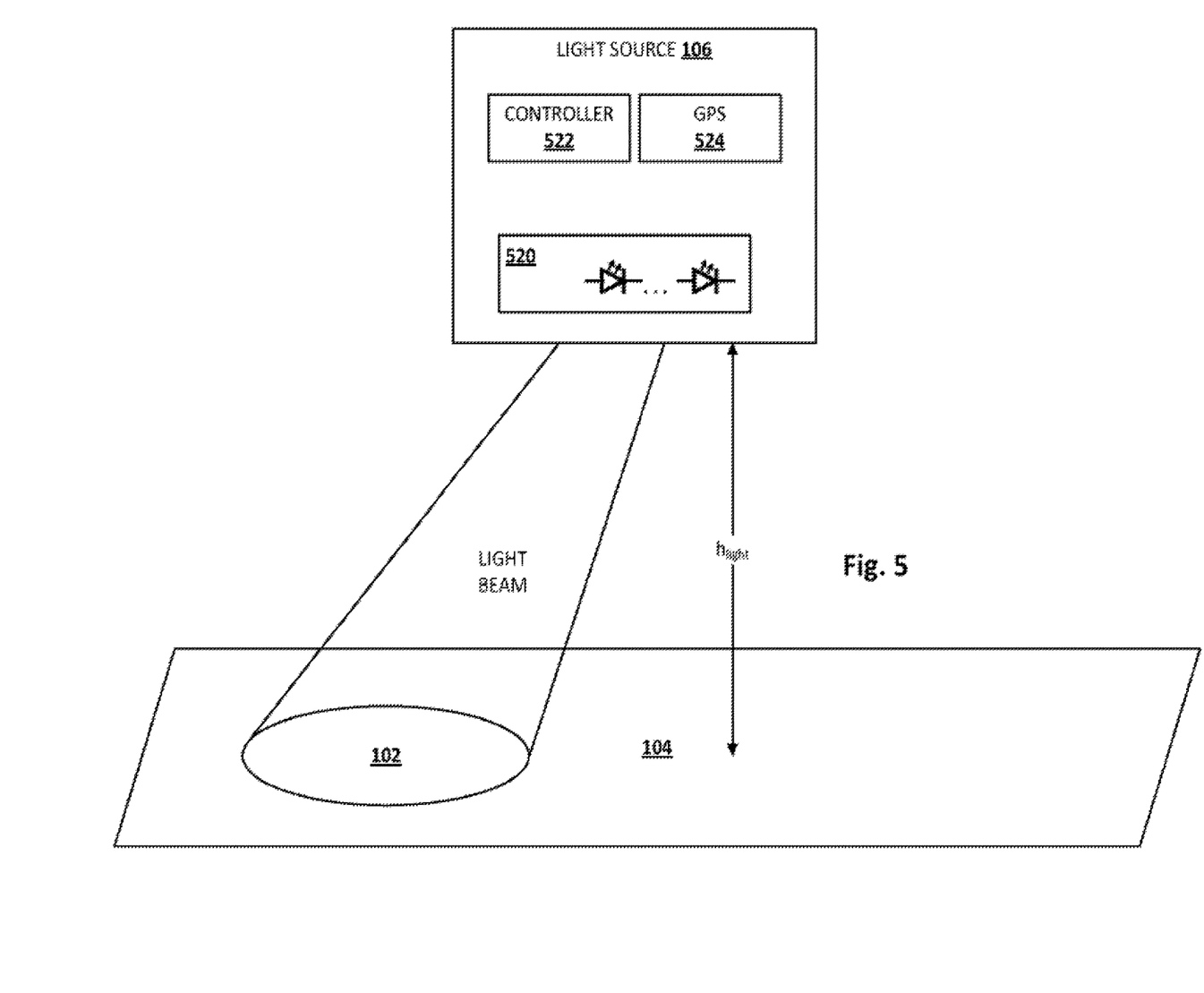
FIG. 5 schematically depicts an example light source, in accordance with various embodiments.

FIG. 5 schematically depicts components of an example light source 106, in accordance with various embodiments. Light source 106 may include one or more light-emitting diodes (LEDs) 520 and a controller 522 operably coupled with the one or more LEDs 520 and configured to selectively energize the one or more LEDs 520 to emit light carrying a coded light signal. As noted above, in various embodiments, the coded light signal may convey various information about a location of lighting effect 102 projected by the one or more LEDs onto surface 104. For example, in some embodiments, the information about the location of lighting effect 102 includes a location of a center of lighting effect 102. In some embodiments, the coded light signal also conveys a reference distance (e.g., $h_{light}$) between light source 106 and surface 104.

In some embodiments, controller 522 may be configured to derive the information about the location of lighting effect 102 based on a direction of a light beam produced by the one or more LEDs 520. For instance, light source 106 may be aware of its location, either by being commissioned by a commissioning device or via a GPS unit 524. Light source 106 may also have stored in memory a distance (e.g., $h_{light}$) between light source 106 and surface 104 onto which it projects a lighting effect 102. Using these values, as well as a direction of a light beam emitted by light source, light source 106, e.g., by way of controller 522, may be configured to calculate a location of lighting effect 102. In other embodiments, controller 522 may be configured to derive the information about the location of the lighting effect based on a width of a light beam produced by the one or more LEDs 520.

Although in examples described herein, lighting effect 102 has been projected on a horizontal surface, this is not meant to be limiting. Lighting effect 102 may be projected onto surfaces of any orientation, including horizontal, vertical, and anything in between. Moreover, surfaces 104 are not necessarily limited to floors. In some cases, the surfaces 104 may be raised surfaces of tables or other furniture. In such case, the Z-coordinate of lighting effect 102 and/or a reference distance between light source 106 and surface 104 (e.g., $h_{light}$) may reflect the raised surface.

Figure 6:
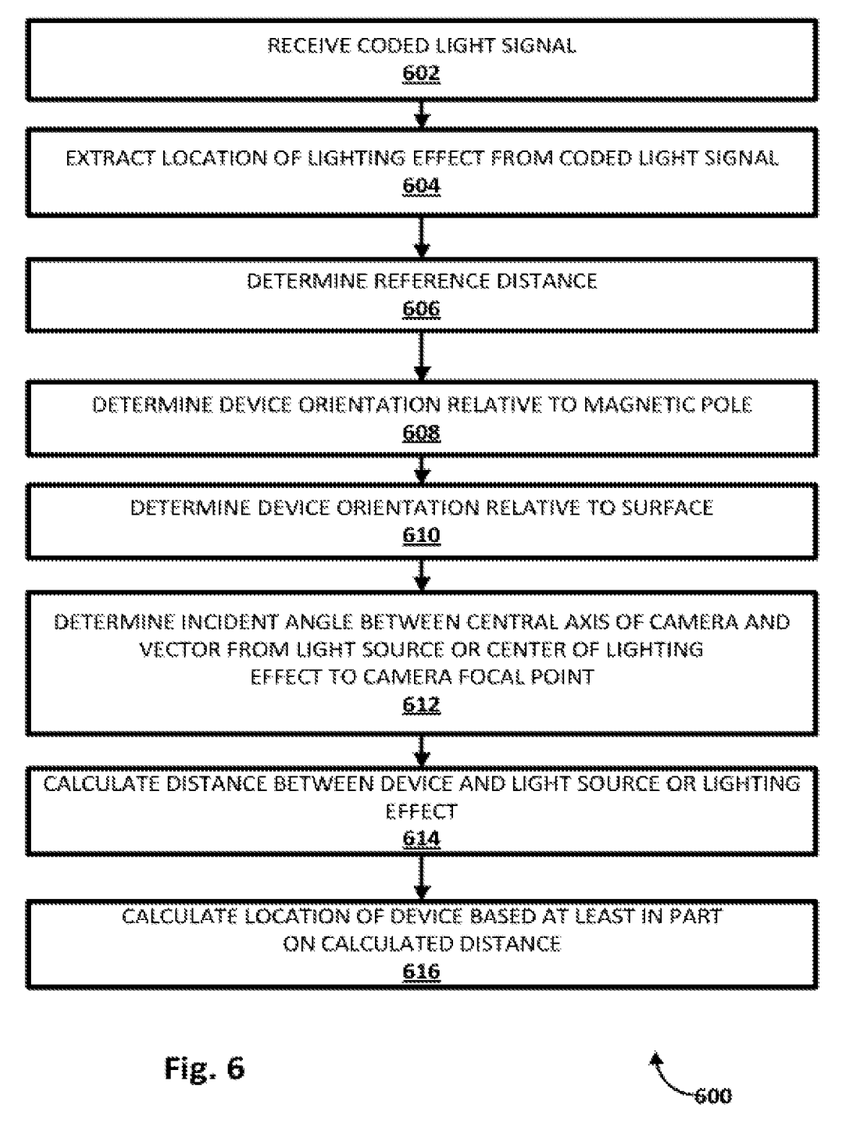
FIG. 6 schematically depicts an example method that may be implemented by a mobile computing device to determine its location within an environment, in accordance with various embodiments.

FIG. 6 depicts an example method 600 that may be implemented by a mobile computing device such as smart phone 100 to calculate its position within an environment, in accordance with various embodiments. At block 602, a coded light signal may be received, e.g., by smart phone 100 from light source 106. At block 604, smart phone may extract a location of a lighting effect 102 produced by light source 106 on a surface 104.

At block 606, smart phone 100 may determine a reference distance. If a camera of smart phone 100 is pointed at lighting effect 102, then the reference distance may be an estimated distance between smart phone 100 and surface 104, e.g., $h_{phone}$ in FIG. 1. If the camera of smart phone 100 is pointed at light source 106, on the other hand, then the reference distance may by a distance between light source 106 and the surface 104 on which light source 106 projects its lighting effect 102, e.g., $h_{light}$ in FIGS. 3 and 4. In some cases, $h_{phone}$ may be subtracted from $h_{light}$ to reflect a true distance in a direction of the Z-axis between smart phone 100 and light source 106.

At block 608, smart phone 100 may determine its orientation relative to a magnetic pole, e.g., using a compass. For example, in FIG. 3, smart phone 100 determined the angle $\varphi_2$. At block 610, smart phone 100 may determine its orientation relative to surface 104, e.g., using one or more accelerometers and/or gyroscopes. For example, smart phone 100 in FIG. 1 determined the angle δ. At block 612, smart phone 100 may determine an incident angle between a central axis of its camera and a vector from light source 106 or a center of lighting effect 102 to the camera's focal point. For instance, smart phone 100 in FIG. 1 determined the angle ε as demonstrated in FIG. 2 by determining a distance 116 between a center of display 114 and a rendition of lighting effect 102 on display 114.

At block 614, smart phone 100 may calculate a distance between itself and lighting effect 102 and/or light source 106. For example, in FIG. 1, smart phone 100 used the sum of the two angles δ and ε in FIG. 1, in addition to the reference distance $h_{phone}$, to calculate ΔY. Similar techniques were implemented by smart phone 100 in FIG. 3 to determine $r_{2x,y}$ and $r_{3x,y}$.

At block 616, based on the distance between smart phone 100 and lighting effect 102 and/or light source 106, as well as the location of lighting effect 102 (as conveyed by the coded light signal emitted by light source 106), smart phone 100 may calculate its location in environment.

Figure 7:
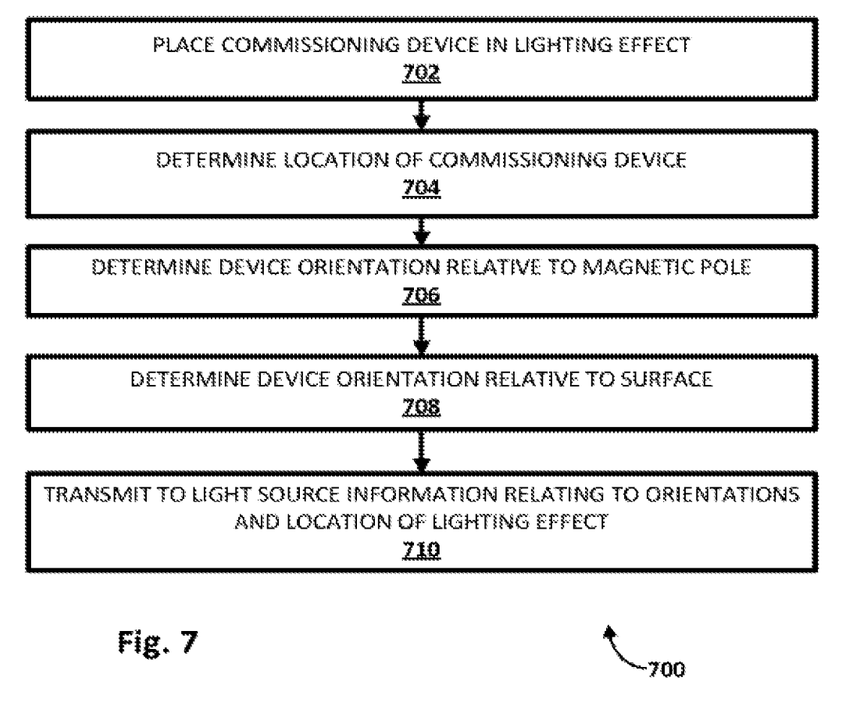
FIG. 7 depicts an example method of commissioning a light source, in accordance with various embodiments.

FIG. 7 depicts an example method 700 that may be implemented using commissioning device 418, in accordance with various embodiments. At block 702, commissioning device 418 may be placed in lighting effect 102, e.g., at its center. At block 704, commissioning device 418 may determine its location, e.g., using GPS or by tracking turns and rotations of its wheels.

At block 706, commissioning device 418 may determine its orientation relative to a magnetic pole, e.g., using a compass. For example, in FIG. 4, the commissioning device determined the angle $\varphi_3$. At block 708, commissioning device 418 may determine its orientation relative to surface 104. For example, in FIG. 4, commissioning device 418 determined the angle $\varepsilon_3$ based at least in part on an orientation of its camera or light sensor.

At block 710, commissioning device 418 may transmit the information determined at block 704-708 to light source 106, e.g., using various communication technologies such as Wi-Fi, Bluetooth, coded light, NFC, RFID, and so forth.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

Reference numerals appearing in the claims, if any, are provided merely for convenience and should not be construed as limiting the claims in any way.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A computer-implemented method for commissioning a light source, comprising:
   placing a commissioning device in a lighting effect projected by the light source onto a surface;
   determining, by the commissioning device, a location of the commissioning device within an environment; and
   transmitting, by the commissioning device to the light source, a location of the lighting effect within the environment, wherein the location of the light effect is based at least in part on the determined location of the commissioning device.

2. The computer-implemented method of claim 1, wherein the transmitting further comprises transmitting a reference distance between the light source and the surface.

3. The computer-implemented method of claim 1, wherein the transmitting further comprises transmitting an angle between a first vector that is normal to the surface and extends from a center of the lighting effect, and a second vector from the commissioning device to the light source.

4. The computer-implemented method of claim 3, further comprising calculating, by the commissioning device, the angle based at least in part on a distance between a rendition of the lighting effect on a display of the commissioning device and a center of the display.

5. The computer-implemented method of claim 1, wherein the transmitting further comprises transmitting an angle between a first vector that extends along the surface from a center of the lighting effect to a position on the surface opposite the light source, and a second reference vector that is predefined relative to a magnetic pole.

6. The computer-implemented method of claim 5, further comprising calculating, by a mobile computing device, the angle based at least in part on an orientation of the mobile computing device relative to the magnetic pole.

* * * * *